F. H. VAN LOOZEN.
DEMOUNTABLE RIM.
APPLICATION FILED SEPT. 18, 1919.

1,333,232.

Patented Mar. 9, 1920.

Inventor
Fred H. Van Loozen
By
Obed B. Billman
Attorney

UNITED STATES PATENT OFFICE.

FRED H. VAN LOOZEN, OF LAKEWOOD, OHIO.

DEMOUNTABLE RIM.

1,333,232.        Specification of Letters Patent.        Patented Mar. 9, 1920.

Application filed September 18, 1919. Serial No. 324,533.

*To all whom it may concern:*

Be it known that I, FRED H. VAN LOOZEN, a citizen of the United States, residing at Lakewood, in the county of Cuyahoga and State of Ohio, have invented certain new and useful Improvements in Demountable Rims, of which the following is a specification.

My invention relates to improvements in demountable rims, and more particularly to that class or type which are used in connection with motor vehicle wheels and pneumatic tires.

The primary object of the invention is to provide a generally improved demountable rim of this class, which will be exceedingly simple in construction, cheap of manufacture and efficient in use.

A further and very important object of the invention is the provision of a demountable rim adapted to receive and to be readily attached to or detached from any ordinary pneumatic tire of either the straight sided or the clencher type, and without the use of any special tools.

A still further and very important object of the invention is the provision of an improved two-part or circumferentially split demountable rim having improved means for detachably connecting and interlocking the parts together in assembled position.

With the above mentioned and other ends in view, the invention consists in the novel construction, arrangement and combination of parts, hereinafter described, illustrated in some of its embodiments in the accompanying drawings, and particularly pointed out in the appended claims.

Figure 1:
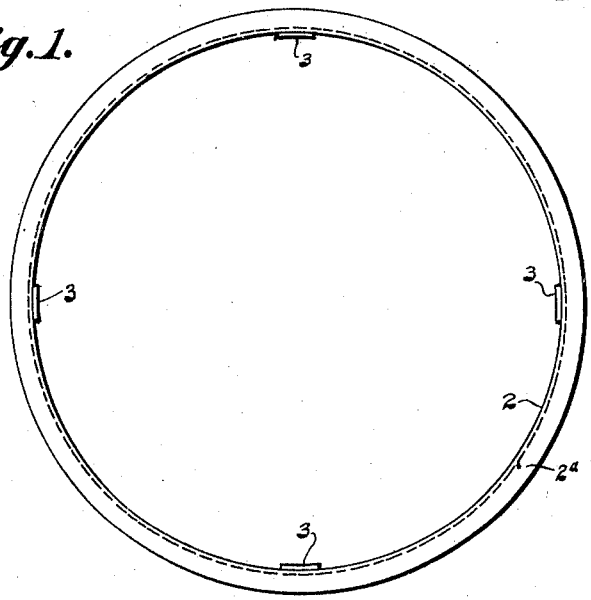

Referring to the drawings, forming a part of this specification, Figure 1, is a side elevation of a tire rim of the straight side type detached from the vehicle wheel and tire.

Figure 2:
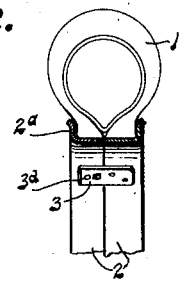

Fig. 2, a fragmentary cross sectional view of the same, attached to a tire of the straight sided heel type.

Figure 3:
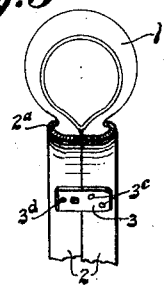

Fig. 3, a similar view of the same attached to a tire of the beaded or clencher type.

Figure 4:
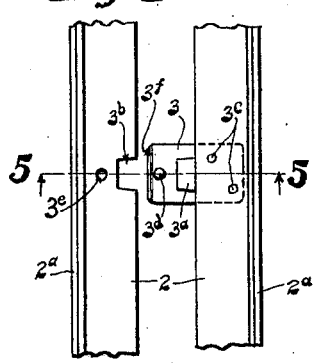

Fig. 4, an enlarged fragmentary disassembled view of the interlocking tongue and recess portions of the same before bringing the rim sections together for interlocked assembled position.

Figure 5:
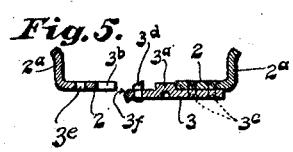

Fig. 5, a cross sectional view taken on line 5—5, of Fig. 4.

Figure 6:
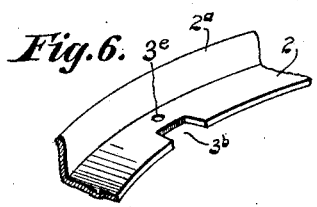

Fig. 6, a fragmentary perspective view of the inner or recess portion of one of the rim sections.

Figure 7:
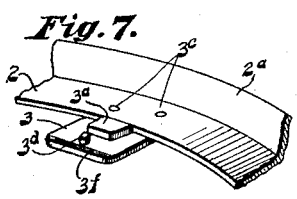

Fig. 7, a similar view of the interlocking tongue or lug portion of the same.

Figure 8:
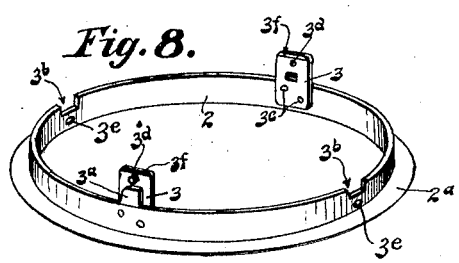

Fig. 8, a perspective view of one of the rim sections detached.

Similar numerals of reference designate like parts throughout all the figures of the drawings.

The improved demountable rim is adapted to be mounted upon and be attached to any suitable or convenient vehicle wheel and may be secured thereto in any convenient and suitable manner.

As a convenient means of readily attaching the tire rim to or detaching the same from a pneumatic tire 1, the tire rim is preferably circumferentially divided by being made up in the form of abutting rim sections 2, said rim sections being preferably in the form of companion sections of like form meeting or abutting at the median or central portion of the rim and terminating at their sides in tire engaging flanges $2^a$. The tire engaging flanges $2^a$, may be either of the straight sided type for attachment to a tire of the straight sided type, as indicated in Figs. 1 and 2, and Figs. 4 to 8, inclusive of the drawings, or if desired may be in the form of clencher flanges for attachment to a tire of the clencher type, as shown in Fig. 3, of the drawings.

As a means of readily attaching the rim sections 2, to each other and detaching the same from each other in the act of assembling and disassembling such parts with respect to the tire casing 1, and particularly as a means of interlocking the companion rim sections together to prevent relative lateral or circumferential movements when secured to the tire casing and mounted upon the vehicle wheel, the rim sections 2, are provided with improved connecting and interlocking mechanism consisting, in the present instance, of oppositely arranged cross or coupling members 3, on the rim sections provided with attaching elements adapted to engage with the opposite rim section. The coupling members 3, also preferably include key or lug members $3^a$, extending from the inner side of one of the rim sections and adapted to enter into and interlock with correspondingly shaped recesses $3^b$, in the adjacent side of the opposite or companion rim member.

The cross or connecting members 3, are preferably arranged on the companion rim sections 2, in diametrically opposite relation to each other and are preferably secured beneath the same in any suitable and convenient manner, as for example,—by means of rivets or fastening elements 3ᶜ, and as a means of automatically connecting the cross or connecting members 3, to the adjacent or opposing rim section, the coupling members 3, are preferably provided at their free ends with upwardly extending projections or thrust pins 3ᵈ, adapted to enter correspondingly formed and located pin receiving openings 3ᵉ. As a further means of facilitating the assembly of the parts the projecting ends of the coupling members 3, are preferably of spring or resilient material and the ends of the projections or pins 3ᵈ, are preferably slightly beveled, as shown most clearly in Fig. 5, and if desired the ends of the coupling or connecting members 3. may likewise be similarly beveled as at 3ᶠ.

As a means of causing the projections or pins 3ᵈ, to be brought into registry with the openings 3ᵉ, when the companion rim sections 2, are brought together in securing a tire casing thereon, and particularly as a means of preventing circumferential movement relatively of the rim sections when assembled, the sides of the key or lug members 3ᵃ, are preferably slightly beveled or tapered toward the free ends of the key members and so likewise the sides of the recesses 3ᵇ, adapted to receive the same.

When it is desired to detach the rim sections for detachment from the tire casing, the free ends of the cross or connecting members 3, may be bent inwardly away from the connected rim sections, so as to detach the projection or stud pin from the pin opening and moving the sections slightly out of assembled or registered position, and this being done successively on the various cross members until all are removed, the rim sections may be then readily detached.

From the foregoing description, taken in connection with the accompanying drawings, the construction, operation and advantages of my invention will be readily understood.

Having thus described some of the embodiments of my invention, what I claim and desire to secure by Letters Patent, is,—

1. A tire rim, comprising circumferentially split rim sections provided on their abutting sides with interlocking transversely extending tapered tongue and recess members, said tongue members being resilient and provided with radially extending pins removably entering corresponding openings formed in the adjacent rim section, said tapered tongue and recess members serving to guide said pins into said openings when the rim sections are assembled.

2. A tire rim, comprising flanged like rim sections provided with subjacent resilient cross coupling members carrying pin and shoulder projections detachably seated in corresponding pin openings and recesses in the opposite rim section, said pin openings being opposite said recesses and the latter and said shoulders being tapered to centralize said pin projections in said openings when said rim sections are brought together.

3. A demountable rim for vehicle wheels, comprising flanged rim sections provided on their under sides with spring coupling members extending across the abutting portions thereof and carrying laterally extending tapered key members, said coupling members being also provided with radial projections adapted to enter corresponding openings in the opposite rim section and said rim section being provided with tapered recesses adapted to receive said tapered key members and guide said radial projections into said openings.

In testimony whereof I have affixed my signature.

FRED H. VAN LOOZEN.